Figure 1:
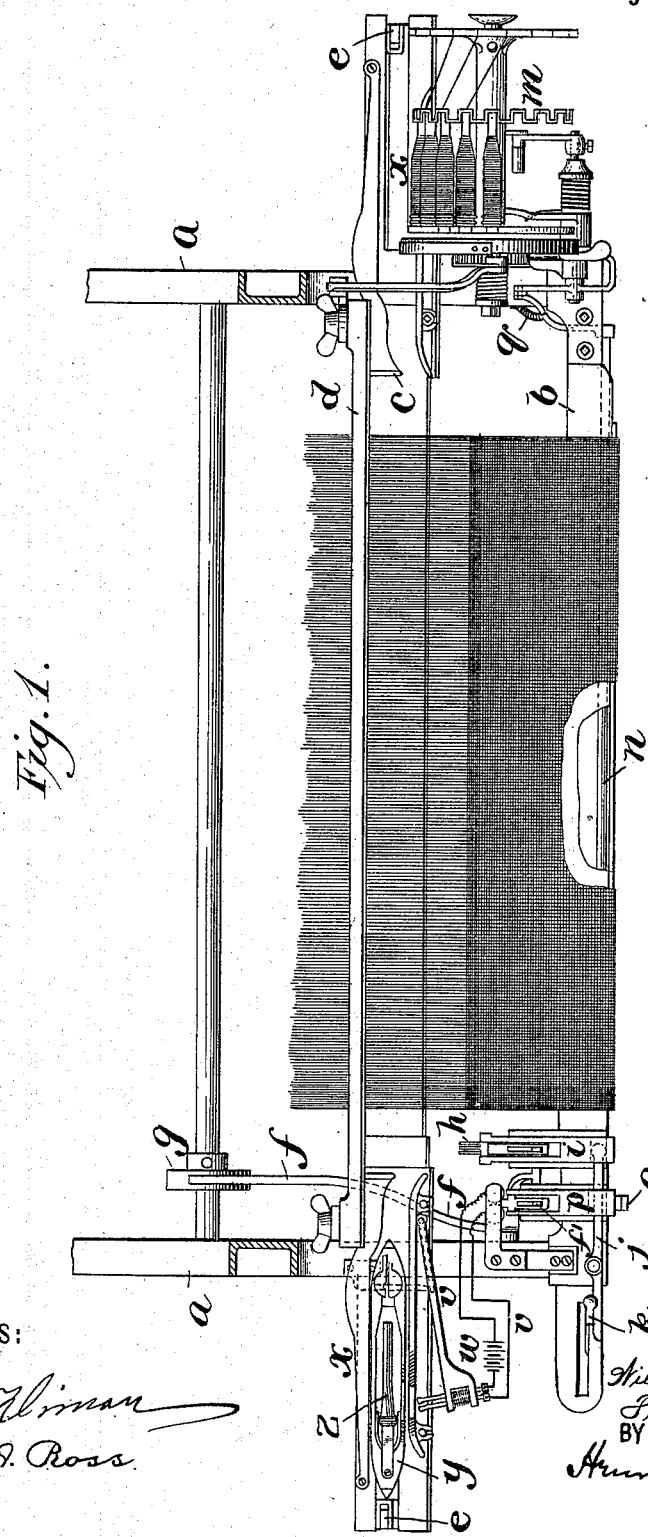

No. 681,164. Patented Aug. 20, 1901.
W. H. BAKER & F. E. KIP.
WEFT REPLENISHING AND CONTROLLING MECHANISM FOR LOOMS.
(Application filed Mar. 28, 1901.)

(No Model.) 5 Sheets—Sheet 1.

WITNESSES:
INVENTORS:
William H. Baker
Frederic E. Kip
BY
ATTORNEY

No. 681,164.  
Patented Aug. 20, 1901.
W. H. BAKER & F. E. KIP.
WEFT REPLENISHING AND CONTROLLING MECHANISM FOR LOOMS.
(Application filed Mar. 28, 1901.)
(No Model.)  
5 Sheets—Sheet 2.
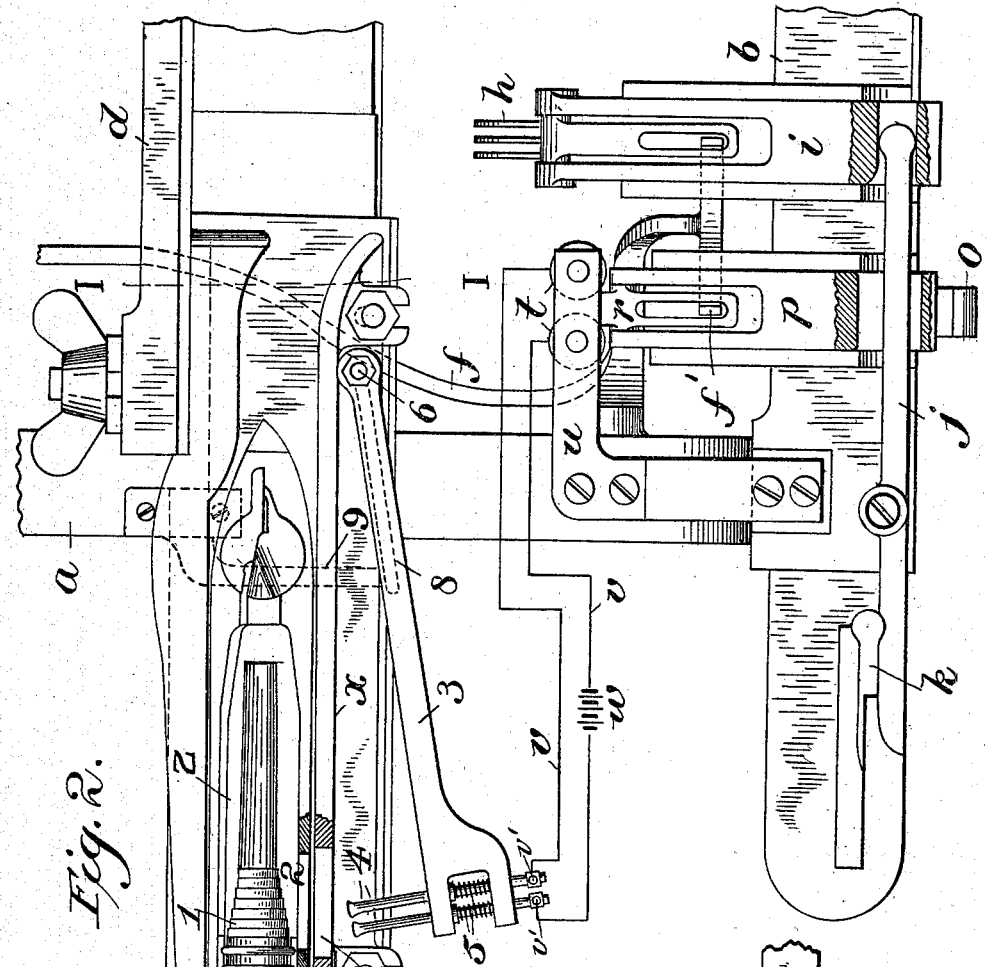
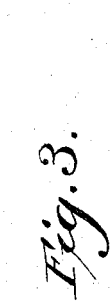

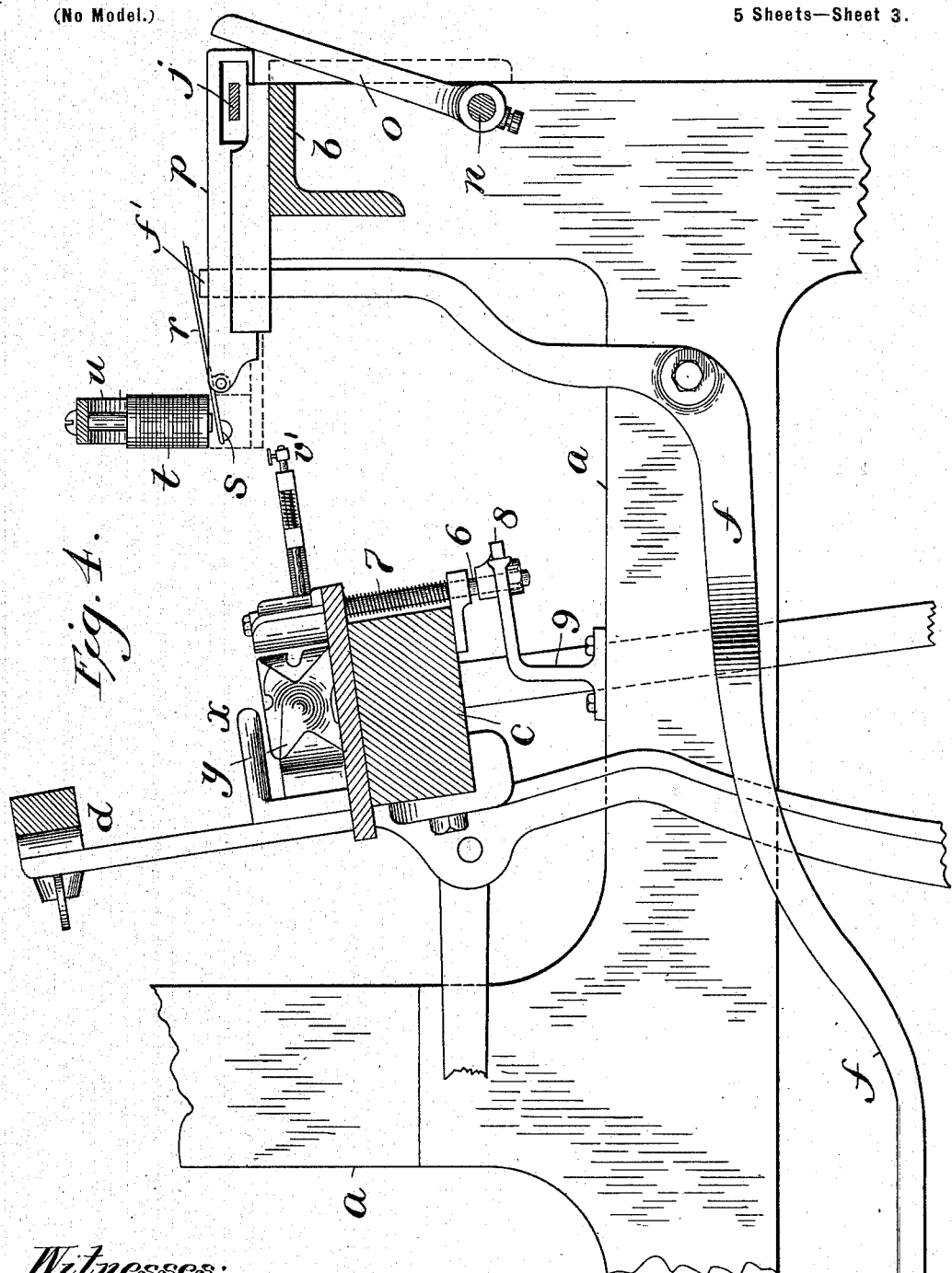

No. 681,164. Patented Aug. 20, 1901.
W. H. BAKER & F. E. KIP.
WEFT REPLENISHING AND CONTROLLING MECHANISM FOR LOOMS.
(Application filed Mar. 28, 1901.)
(No Model.) 5 Sheets—Sheet 4.
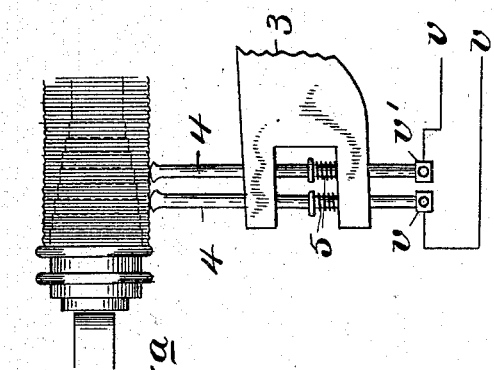
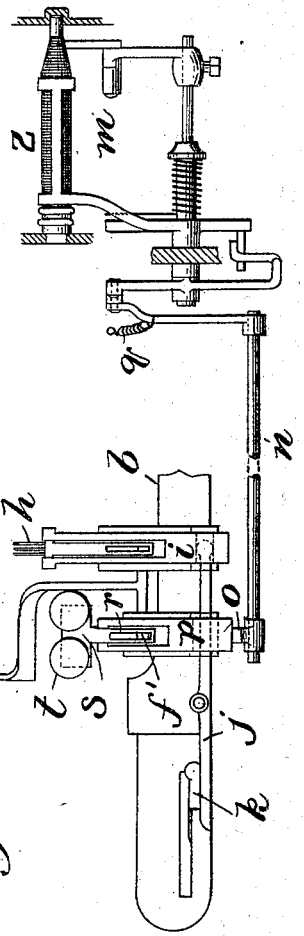
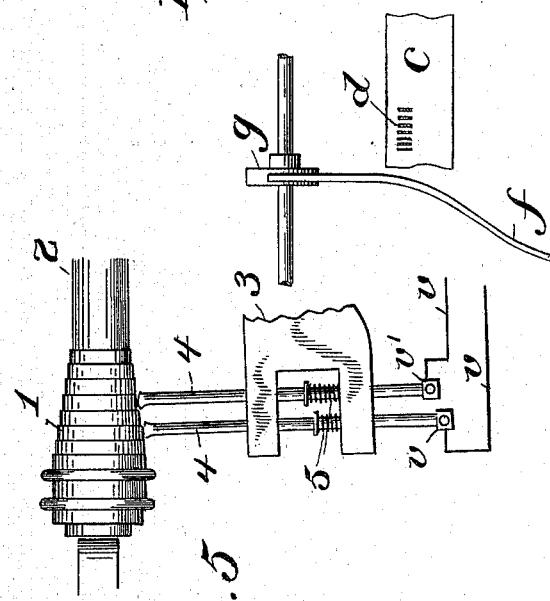
WITNESSES:
INVENTORS:
William H. Baker
Frederic E. Kip
BY
ATTORNEY No. 681,164. Patented Aug. 20, 1901.
W. H. BAKER & F. E. KIP.
WEFT REPLENISHING AND CONTROLLING MECHANISM FOR LOOMS.
(Application filed Mar. 28, 1901.)
(No Model.) 5 Sheets—Sheet 5.
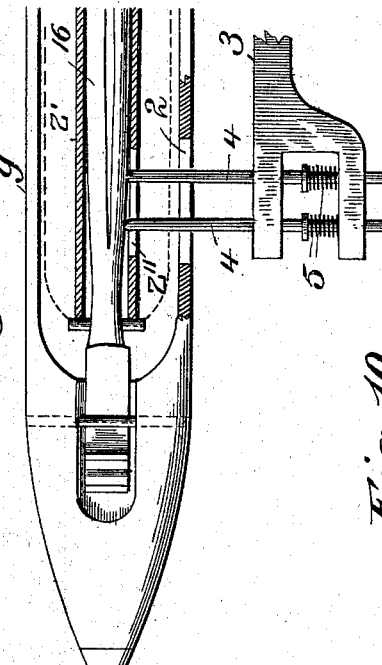
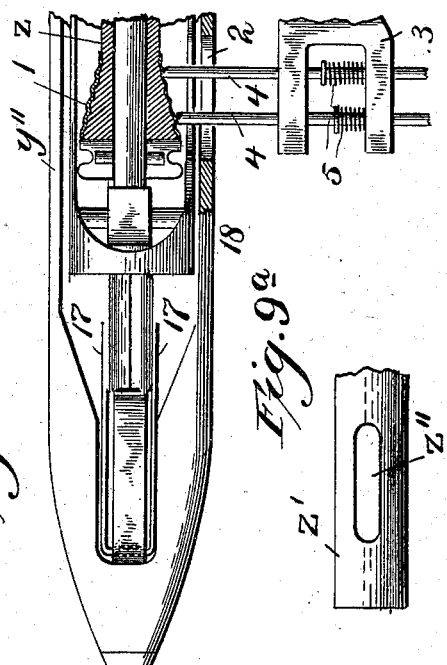
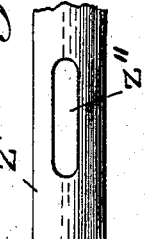
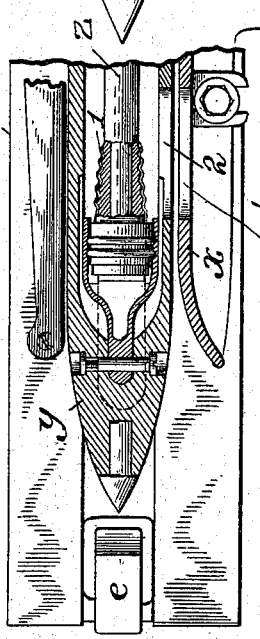
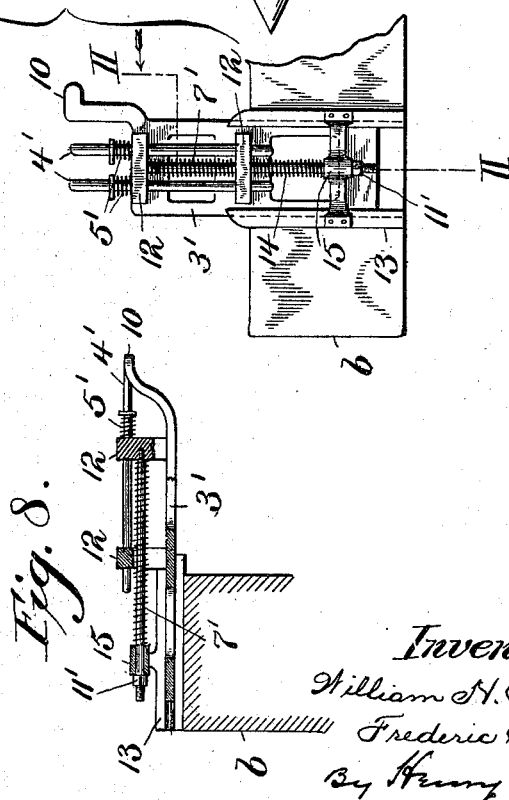
Witnesses:
J. B. McGirr.
Peter A. Ross.
Inventors:
William H. Baker
Frederic E. Kip
By Henry Connett
Attorney

UNITED STATES PATENT OFFICE.

WILLIAM H. BAKER, OF CENTRAL FALLS, RHODE ISLAND, AND FREDERIC E. KIP, OF MONTCLAIR, NEW JERSEY.

WEFT REPLENISHING AND CONTROLLING MECHANISM FOR LOOMS.

SPECIFICATION forming part of Letters Patent No. 681,164, dated August 20, 1901.

Application filed March 28, 1901. Serial No. 53,253. (No model.)

*To all whom it may concern:*

Be it known that we, WILLIAM H. BAKER, residing at Central Falls, Providence county, Rhode Island, and FREDERIC E. KIP, residing at Montclair, Essex county, New Jersey, citizens of the United States, have invented certain new and useful Improvements in Weft Replenishing and Controlling Mechanisms for Looms, of which the following is a specification.

This invention relates to improvements in the class of looms which employ a weft or filling exhaustion indicating mechanism the operations of which are controlled by electricity.

In the class of mechanisms for supplying weft or filling to the loom automatically, of which there are many kinds, some supply fresh shuttles from a magazine as the filling becomes nearly or quite exhausted in the running shuttle, and these are known as "shuttle-changers." A type of such a loom is fully described in the Letters Patent No. 637,695, granted to us November 21, 1899. On the other hand, some supply fresh bobbins or cops to the running shuttle, the latter not being changed. In some of these constructions the exhaustion or partial exhaustion of the weft or filling in the running shuttle serves to close an electric circuit, which controls and positions the parts, so that the mechanical devices which supply or change the weft or filling are set in operation. On the other hand, this control has also been effected through a mechanical "feeler," which enters the shuttle and serves to detect the substantial or complete exhaustion of the weft in the running shuttle when the lay beats up the shot. In the United States patent to Chace, No. 633,976, of September 26, 1899, the filling-carrier contains a circuit-closer whereby the normally open electric circuit, which controls the operation of the replenishing mechanism, is closed at the time the weft or filling is substantially exhausted by the entry of the terminals of said circuit into the filling carrier or shuttle, where they contact with the said circuit-closer.

In the constructions of weft or filling changing or replenishing devices wherein electricity or electromagnetic controlling devices have been employed there has usually been considerable complexity due to the fitting up of the shuttles, bobbins, and shuttle-boxes with electrical contacts, springs, terminals, and partial circuits, and this has been found somewhat objectionable, especially in certain classes of looms, whereas in the case of the mechanical feeler, which feels the bobbin at each pick in order to ascertain the extent of exhaustion of the weft, a difficulty arises from the extreme exactness or nicety of construction of the mechanical parts, owing to the minute difference between the condition of the bobbin when the controlling mechanism is to remain inactive and that when said mechanism should act to supply a fresh bobbin or shuttle.

Our present invention has to do mainly, if not wholly, with feeling or detective devices whereby the controlling electric circuit shall be closed when the weft or the filling in the running shuttle shall have become substantially or sufficiently exhausted, and therefore it is not material to the invention what form or construction of weft or filling changing or replenishing mechanism (of the many forms and constructions now known) shall be employed, provided only that it shall be capable of being controlled and set in operation by the closing of an electric circuit at or within the shuttle or weft-carrier. We have therefore for convenience adopted for the illustration of our invention the filling supplying or replenishing mechanism illustrated and fully described in the aforesaid patent of Chace, No. 633,976, which may be referred to, if necessary, for a full understanding of such a supplying mechanism.

In the accompanying drawings, which illustrate an embodiment of our invention, Figure 1 is a general plan view of a part of a loom on a small scale and embodying our invention. Fig. 2 is a plan view, on a larger scale, of the parts seen at the left in Fig. 1. Fig. 3 is a transverse vertical section at line I I in Fig. 2. Fig. 4 is an elevation, partly in section, of the parts of the loom seen in Fig. 2, the view being taken from the left in that figure. Fig. 5 is an enlarged detail view of the bobbin and contact devices, showing the position of the parts when the bobbin is substantially denuded or exhausted of weft; and Fig. 5ª is a similar view showing the same parts when the bobbin is full or nearly so. Fig 6 is a somewhat diagrammatic view illustrating the weft or filling supplying mechanism. Fig. 7 is a detail plan view illustrating a slightly-modified construction of the device wherein the circuit-closing contacts are carried on the breast-beam or other non-vibrating part; and Fig. 8 is a sectional elevation of the same, the section being substantially at line II II in Fig. 7. Fig. 9 is a fragmentary view illustrating the application of the invention to a shuttle having a spindle, such as are used in shuttle-changing weft-supplying mechanisms; and Fig. 9ª is a fragmentary view of the cop-tube. Fig. 10 is a similar view illustrating the application of the invention to a bobbin-changing weft-supplying mechanism wherein the bobbin is mounted on a spindle in a weft-case or bobbin-box.

Referring primarily to Figs. 1 to 6 of the drawings, $a$ is the loom-frame; $b$, the breast-beam thereof; $c$, the lay; $d$, the reed; $e$, the picker-sticks; $f$, the weft-hammer, actuated from a cam $g$; $h$, the weft-fork; $i$, the weft-fork slide, actuated at certain times by the weft-hammer; $j$, the knock-off lever, and $k$ the shipper-lever. These are all very common in looms. At the right in Fig. 1 is seen the rotary magazine or "battery" $m$, which is also common in some looms—for example, in that described in the patent of Northrop, No. 529,940, of November 27, 1894. It will only be necessary to briefly describe this weft or filling changing or supplying mechanism here, so as to show its connection with the feeler device of our present invention. In front of or below the breast-beam is mounted a rock-shaft $n$, which by its rocking or being rocked puts in position for operation the weft-supplying mechanism connected with the battery or magazine $m$. This shaft $n$ has on it an upright arm $o$, which is situated in the path of a slide $p$ on the breast-beam, being held up to said slide by a suitable spring $q$. (Seen in Fig. 6.) The slide $p$ has in it an aperture or slot, up through which extends a branch arm $f'$ on the weft-hammer $f$. On the slide $p$ is pivotally mounted a lever $r$, Figs. 2 and 4, the front arm of which is also apertured or slotted, so that when this arm is depressed the branch $f'$ of the weft-hammer will engage it. Now when from any cause this apertured arm of the lever $r$ is depressed, so as to engage the branch of the weft-hammer, the latter will drive forward the slide $p$, and through the arm $o$ rock the shaft $n$, thereby setting the weft-supplying mechanism in position for operation to supply weft or filling when the lay next beats up, all in a well-known way. On the rear or inner arm of the lever $r$ is mounted the armature $s$ of an electromagnet $t$, mounted on a bracket $u$ above the lever $r$. The weight of the armature keeps the slotted and lighter front (or outer) arm of the lever $r$ elevated normally; but if the magnet $t$ be energized by the closing of an electric circuit through its coils it will attract its armature, and thus depress the apertured outer arm of the lever $r$ into engagement with the branch $f'$ of the vibrating weft-hammer.

The object of our present invention is to close at proper times an electric circuit which includes the coils of said magnet $t$, and this circuit-closing device we will now describe.

The wires or conductors $v$ of the controlling-circuit include a battery $w$ or other form of generator and may be arranged in any convenient way. Herein they are illustrated diagrammatically. On the lay, at the opposite side of the loom from the magazine or battery, is mounted an ordinary shuttle-box $x$, in which is represented a shuttle $y$, having in it a bobbin $z$.

The shuttle and bobbin employed with our invention may be of the common ordinary kind employed on all forms of looms, except that the shuttle will have an aperture or way formed in its side for the entry of the feeler and the bobbin will have on it at the proper point some form of circuit-closing plate, sleeve, band, or part, usually of metal. In Figs. 2 and 5 this metal circuit-closer 1 on the bobbin is represented as a closely-fitting thin sleeve, and in Figs. 2 and 7, 2 designates the aperture, slot, or way formed in the shuttle-wall to admit the feeler. The shuttle-box $x$ will have an aperture in its side to register with the aperture 2 in the shuttle when the latter is in place in the box. Mounted on the lay in any convenient manner (see particularly Figs. 2 and 3) is a feeler-arm 3, carrying two elastically-yielding feelers 4 4, adapted under certain conditions to enter the shuttle at the aperture 2 and bear on or contact with the sleeve 1 on the bobbin. These feelers form terminals of the electrical controlling-circuit. As shown herein, the conductors $v$ from the opposite poles of the battery $w$ terminate at binding-posts $v'$ on the feelers 4, and the respective feelers have cushion-springs 5. These may be coil-springs on the feelers, situated in a fork in the end of the arm 3, as shown in Fig. 2. The feeler-arm 3, which constitutes a yielding guide for the feelers, is secured to an upright spindle 6, mounted to rock in a bearing in the lay, and a suitably-arranged spring 7, Fig. 3, tends at all times to keep the feelers 4 pressed inward toward the bobbin. The spring 7 may be a spiral spring coiled about the spindle 6, as clearly shown in Fig. 3. On the lower part or end of the spindle 6 is secured an arm 8, which when the lay recedes to the picking-point finds in its path a suitably-formed fixed obstruction 9, which may be a dagger on the loom-frame. This dagger will be set in such a position that when the arm 8 encounters it the feeler-arm will be swung outward, as seen in Fig. 2, far enough for the feelers 4 to clear the shuttle in the shuttle-box and leave the latter free or open for the exit and entry of the shuttle. When the lay beats up, the arm 8 is relieved from the pressure of the dagger 9, and the spring 7 swings the arm back or inward until the feelers 4 are in contact with the bobbin. This contact is maintained except during that part of the movement of the lay during which the dagger 9 is acting.

The operation is as follows: When the bobbin $z$ is full, as seen in Fig. $5^a$, for example, and the lay beats up, the yarn or filling on the bobbin will be interposed between the terminals or feelers 4 and the metal circuit-closer 1 on the bobbin, and this condition will continue until the filling is so far exhausted, Fig. 5, as to expose the metal circuit-closer 1. Then when the lay beats up, with the shuttle $y$ in the box $x$, the feelers 4 will be permitted to contact with said circuit-closer 1, and this contact will be maintained throughout the beating-up movement of the lay and its rearward movement to the picking-point. During this period the weft-hammer acts in the manner before described to set the weft or filling supplying mechanism for operation. The exhausted shuttle is picked to that side of the loom where the magazine $m$ is situated, and when the lay next beats up a fresh bobbin is supplied to the shuttle from the magazine $m$.

In the construction just described the feeler mechanism is mounted on and carried by the lay, and this construction is preferred; but said mechanism may be mounted on the breast-beam or on some other fixed part, so that the feelers or terminals will enter the shuttle when the lay moves up toward the breast-beam. Such a construction is illustrated in Figs. 7 and 8, the former being a plan view similar to Fig. 2 and the latter a longitudinal vertical section through the feeler-slide. In these views the feelers 4' 4' are mounted slidably in blocks 12, of some insulating material, carried by a slide 3', mounted in a guide 13 on an extension of the breast-beam. This slide constitutes a yielding guide for the feelers equally with the feeler-arm 3. The feelers have cushion-springs 5', and the slide 3' has a cushion-spring 7' on a rod 14, fixed at its outer end and playing at its rear end through a bridge 15 on the guide 13. On its free end it has a stop-nut or collar 11' to limit the forward movement of the slide. This device is so set that the feelers enter the shuttle while the lay is beating up, and if the bobbin is sufficiently denuded they close the controlling-circuit through the magnet $t$ and maintain it closed for a length of time sufficient to permit the weft-hammer to act and set the weft or filling supplying mechanism.

It may be well to explain here that where the feelers are mounted on a fixed part of the loom and the bobbin impinges on them with some impact or force it is desirable to employ a buffer 10. (Seen in Figs. 7 and 8.) This buffer is fixed to or forms part of the slide 3' and projects out a little beyond the tips of the feelers 4', so that while there is filling on the bobbin it will strike on the filling or yarn and fend off the feelers; but as the filling is woven off and the bobbin becomes nearly exhausted the buffer will have nothing to impinge upon, and the feelers will then come into play. This is because the bobbin is most reduced in diameter at the point where the buffer impinges, and the yarn also is taken from this point before it leaves the point where the feelers impinge.

The particular arrangement of the contact terminals or feelers is not essential to our invention so long as they enter the side of the shuttle and both contact with a conducting material in the weft-carrier, which is normally covered by the weft or filling and is uncovered when the latter is exhausted or substantially exhausted. Our present invention is, broadly, for a bobbin or weft or filling holder provided with a circuit-closing plate, ring, sleeve, or equivalent and two insulated and yieldingly-sustained feelers to contact with said plate, ring, or sleeve when the bobbin is partially denuded of weft or filling, the said feelers forming the terminals of the electric circuit which controls the times of operation of a weft or filling changing or supplying mechanism for a loom. It will be seen that it is not material to our invention whether the last-named mechanism is a bobbin-changer or a shuttle-changer or whether the weft-holder carrying the circuit-closing plate, ring, or sleeve is a bobbin-cop or butt-cop. Indeed, where the shuttle has a metal spindle to receive what is known as an "all cop" or cop without a tube the said spindle forms a substantial equivalent of the circuit-closing sleeve 1, and the contact therewith of the feelers will close the controlling-circuit. Therefore we wish to be understood as including such a metal spindle, when capable of being denuded and exposed by the exhaustion of the filling, under the term "circuit-closer on the bobbin."

As our invention is applicable to electrically-controlled weft-supplying mechanisms wherein the shuttle is changed (of which those illustrated in our Letters Patent No. 636,704, of November 7, 1899; No. 637,195, of November 14, 1899, and Nos. 637,695 and 637,753, of November 21, 1899, are examples) we have shown in Figs. 9 and $9^a$ a shuttle and cop or weft-holder adapted for applying our present invention to such shuttle-changing mechanisms. In Fig. 9, $y'$ represents the shuttle, provided with a hinged metal spindle 16 of the usual kind to receive a paper cop-tube $z'$, carrying or holding the weft or filling in the usual way. This cop-tube is represented in both Figs. 9 and $9^a$ as provided with an elongated or slot-like aperture $z''$, which is so situated with respect to the aperture 2 in the side of the shuttle that when the feelers 4 enter they will come in contact with the metal spindle 16, provided the weft is so nearly exhausted that said aperture $z''$ is uncovered.

This invention being also applicable as well to the form of electrically-controlled weft-supplying mechanisms wherein bobbins or weft-holders mounted in weft-cases or bobbin-cases, which latter are detachable from the shuttle, are employed—as, for example, those illustrated in our Letters Patent No. 633,944, of September 26, 1899, and Nos. 655,645 and 655,647, of August 7, 1900—we have illustrated in Fig. 10 the practical application of our invention to a shuttle, weft-case, and bobbin of this class. It will only be necessary in respect of this figure to explain that in jaws 17 in the shuttle $y''$ is mounted a bobbin or weft-case 18, the bobbin $z$ in which is the same or may be the same as that shown in the principal views. The difference between this construction and that of the principal views has no relation to what is claimed herein. To apply the present invention to the shuttle and contained weft-case of the patents referred to, it is only necessary to cut down the side of the weft-case at the aperture 2, so as to permit the feelers to reach the metal 1 on the bobbin.

We believe that we are the first to invent and produce a two-poled electric feeler and circuit-closer which is carried by the lay and also the first to invent and produce such a feeler mechanism when yieldingly sustained and wherein both poles or contacts are mounted yieldingly in a yielding spring-cushioned guide mounted on the loom and adapted to indicate the exhaustion of the weft to a predetermined extent for any purpose. Therefore we claim this invention broadly and do not limit ourselves to specific means or constructions for accomplishing the result, as these may be varied without departing materially from our invention.

In the drawings illustrating our invention we have for convenience shown the circuit-closer on the bobbin as entirely uncovered or denuded of weft or filling; but it must be understood that at the time the controlling-circuit is closed there will still be some weft on the bobbin, although not covering that part of the circuit-closer where the contact is made. It is a common feature in this general class of weft-replenishing mechanisms for the feeler to operate while there is still enough of filling in the shuttle to supply a pick or two, and by the words "exhaustion," "denudation," and the like as herein employed we mean such a degree of exhaustion as will still leave a little weft in the shuttle to prevent a mispick in the woven fabric.

The United States patent of Chace, No. 633,976, of September 26, 1899, shows like electromechanical exhaustion-indicating devices for controlling an automatic weft-replenishing mechanism and controlling mechanism for stopping the loom when the weft requires replenishing, and it will be obvious that our electromechanical exhaustion-indicating devices have the same extent or scope of application.

By "exhaustion," "absence," "substantial absence," or "denudation" as referring to the weft or filling in the shuttle we mean such degree thereof as will permit the circuit-changing means to operate while there is still sufficient filling in the shuttle to prevent an imperfection in the cloth being woven.

By "bobbin" or "weft-holder" we mean any form of known weft-holder upon which weft or filling is placed for the purpose of feeding it to the web of the cloth.

Having thus described our invention, we claim—

1. In a loom, a weft-carrier having a contact-piece or circuit-closer which is normally covered by the weft or filling in the carrier, an electrically-controlled weft or filling changing or supplying mechanism, a two-poled feeler forming terminals at a break in the controlling electric circuit and both poles adapted to impinge directly on the weft in the carrier over the said contact-piece, and a yielding guide in which said feelers are mounted, whereby the controlling-circuit is closed when said contact-piece is uncovered by exhaustion of the weft or filling.

2. In a loom, a weft-carrier having a contact-piece or circuit-closer which is normally covered by the weft or filling in the carrier, the lay, an electrically-controlled weft or filling changing or supplying mechanism, and a two-poled feeler mounted on the lay and forming terminals at a break in the controlling electric circuit, said feeler being adapted to contact with said contact-piece and close the controlling-circuit when the weft or filling in the carrier is exhausted to a predetermined extent.

3. In a loom, a weft-carrier having a metallic contact-piece or circuit-closer which is normally covered by the weft or filling in the carrier, the lay, an electrically-controlled weft or filling changing or supplying mechanism, a two-poled feeler pivotally mounted on the lay, its poles forming terminals at a break in the electric controlling-circuit and adapted to contact with said contact-piece and close the controlling-circuit when the weft or filling in the carrier is exhausted to a predetermined extent, and means for operating said feeler.

4. In a loom, a shuttle having an aperture or way and a metallic contact-piece or circuit-closer which is normally covered by the weft or filling in the shuttle, the lay, an electrically-controlled weft or filling changing or supplying mechanism, a two-poled feeler movably mounted on the lay and adapted to move into and out of the running shuttle through an aperture or way in the side of the latter, said feeler forming terminals at a break in the normally open controlling-circuit which contact with said circuit-closer when the weft or filling in the shuttle is exhausted to a predetermined extent, and means for operating said feeler.

5. In a loom, a shuttle having a metallic contact-piece or circuit-closer which is normally covered by the weft or filling in the shuttle, an electrically-controlled weft or filling changing or supplying mechanism, a feeler composed of two poles or terminals of the controlling electric circuit adapted to enter the running shuttle and contact with the circuit-closer therein when the weft or filling therein is exhausted to a predetermined extent, and a buffer adapted to enter the shuttle and impinge on the weft therein and fend off the feeler.

6. In a loom, a shuttle having an aperture or way and a metallic contact-piece or circuit-closer which is normally covered by the weft or filling in the shuttle, the lay, an electrically-controlled weft or filling changing or supplying mechanism, a feeler-arm pivotally mounted on the lay, a two-poled feeler carried by said arm and forming terminals of the controlling electric circuit at a break therein, said feeler being adapted to enter the running shuttle at an aperture or way therein and contact with said circuit-closer when the weft or filling therein is exhausted to a predetermined extent, a spring which tends to cause said feeler to enter the shuttle, and a dagger on the loom adapted to withdraw said feeler at the picking-point.

7. In a loom, the combination with the vibrating lay, the shuttle-boxes thereon, an electrically-controlled weft or filling changing or supplying mechanism, and the running shuttle provided with an aperture or way 2 in its side for the entry of a feeler, and with a metallic circuit-closer or contact-piece which is normally covered by the weft or filling therein, of the feeler-arm 3, mounted pivotally on the lay so as to move horizontally, a spring which tends to move said arm toward the shuttle-box, a dagger on the loom-frame adapted to move said arm away from the shuttle-box when the lay recedes, and the feeler, formed of two cushioned metallic terminals of the controlling-circuit carried by said arm 3, and adapted to enter the weft-carrier and contact with the circuit-closure thereof when the latter is exposed by the exhaustion of the weft, thereby closing the controlling-circuit.

8. In a loom, the combination with the vibrating lay, the shuttle-boxes thereon, a running shuttle having an aperture or way in its side for the entry of a feeler, and an electrically-controlled weft or filling changing or supplying mechanism, of a bobbin or weft-holder $z$ in said shuttle, said bobbin being provided with a sleeve of metal 1 in position to be covered by the weft on the bobbin, a two-pole feeler adapted to enter the shuttle and contact with said sleeve 1, said feeler comprising two cushioned terminals of the open controlling-circuit at a break in the same, and a yielding guide in which said feelers are mounted.

9. In a loom, a lay, means to move it, a shuttle with a weft or filling holder therein provided with circuit-closing means, a yielding, spring-cushioned guide, and electric-circuit terminals slidable in said guide and adapted to yield by contact with the filling on the filling-holder at the movement of the lay.

10. In a loom, a lay, means to move it, a shuttle with a weft or filling holder therein provided with circuit-closing means, a yielding, spring-cushioned guide, electric-circuit terminals slidable therein and adapted to yield by contact with the filling on the filling-holder at the movement of the lay, and means independent of the terminals for pressing back said guide.

11. In a loom, a lay, means to move it, a shuttle with a weft or filling holder therein provided with circuit-closing means, filling-changing mechanism, a yielding, spring-cushioned guide, electric-circuit terminals slidable therein and adapted to yield by contact with the filling on the filling-holder at the movement of the lay, and means independent of the terminals for pressing back said guide.

12. In a loom, a shuttle having a contact-piece or circuit-closer which is normally covered by the weft or filling in the shuttle, a two-pole feeler forming terminals at a break in an electric circuit and both poles adapted to impinge directly on the weft in the shuttle over said contact-piece, the said circuit, and a yielding guide in which said feelers are mounted, whereby the circuit is closed when said contact-piece is uncovered by exhaustion of the weft or filling.

13. In a loom, a shuttle having a contact-piece or circuit-closer which is normally covered by the weft or filling in the shuttle, an electric circuit, a two-pole feeler mounted on the lay and forming terminals at a break in said circuit, said feeler being adapted to contact with said contact-piece and close said circuit when the weft or filling in the shuttle is exhausted to a predetermined extent.

14. In a loom, a shuttle having a metallic contact-piece or circuit-closer which is normally covered by the weft or filling, an electric circuit, a feeler composed of two poles or terminals of the said circuit adapted to enter the running shuttle and contact with the circuit-closer therein when the weft or filling therein is exhausted to a predetermined extent, and a buffer adapted to enter the shuttle and fend off the feeler by impinging on the weft therein.

In witness whereof we have hereunto signed our names, this 25th day of March, 1901, in the presence of two subscribing witnesses.

WILLIAM H. BAKER.
FREDERIC E. KIP.

Witnesses:
PETER A. ROSS,
LOUIS M. LEGENDRE.